Feb. 23, 1932.　　　　J. U. LEMMON, JR　　　　1,847,062
METHOD OF PREPARING SAUSAGE ROLLS AND KNIFE THEREFOR
Filed Oct. 21, 1931
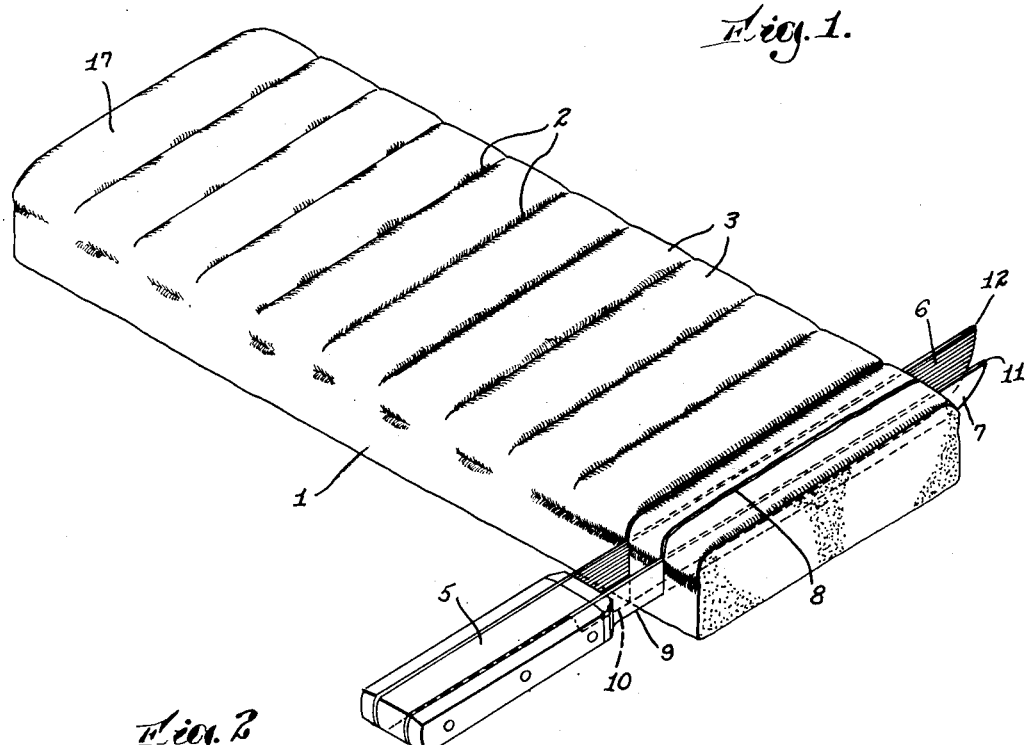
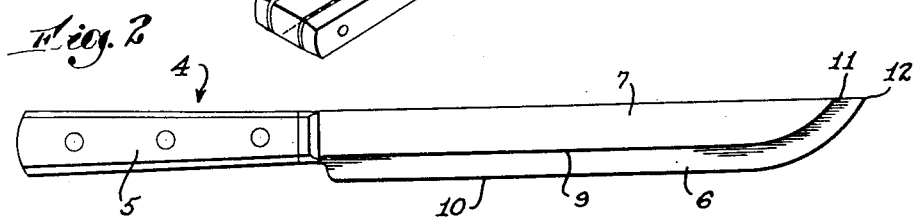
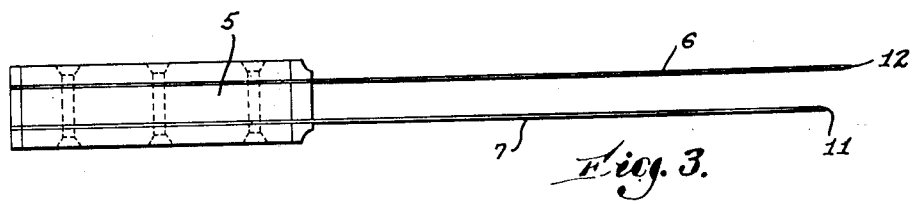
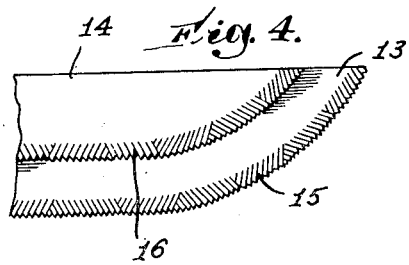
Inventor
John U. Lemmon, Jr.,
Harold J. Clark.
by Attorney Patented Feb. 23, 1932

1,847,062

UNITED STATES PATENT OFFICE

JOHN U. LEMMON, JR., OF NEWTON, MASSACHUSETTS, ASSIGNOR TO HATHAWAY BAKERIES, INC., OF CAMBRIDGE, MASSACHUSETTS, A CORPORATION OF MASSACHUSETTS

METHOD OF PREPARING SAUSAGE ROLLS AND KNIFE THEREFOR

Application filed October 21, 1931. Serial No. 570,067.

My present invention relates to a novel method of preparing rolls to receive a sausage or other filling, and also to a novel knife for carrying out said method.

Up to the present time, it has been customary, in preparing rolls to receive a Frankfort, or the like, to bake said rolls in sheets with the individual rolls readily separable from adjacent rolls by breaking, and, after breaking, to hold the roll on a board or table and make a slit or recess longitudinally thereof from the top surface downwardly for the reception of a sausage or other filling. This method is unsatisfactory for many reasons. It is difficult, if not impossible, to cut a recess of proper depth throughout the entire length of the roll, by this prior method. If the recess thus cut is too shallow, when the roll is opened to receive its filling, said roll may break or tear. If the recess is cut too deep, when the roll is opened to receive its filling the sections of said roll may become separated along their bottom edges, either partially or entirely.

Furthermore, with the advent of present day electric toasting machines, rolls prepared in the foregoing manner were still further unsatisfactory, because of the fact that each roll had a rough surface on each side, so that a roll thus prepared did not lend itself to toasting because of the burning of the roughened surfaces. This resulted in necessitating two cutting operations to prepare the roll, the first cutting operation severing the roll from the remainder of the sheet, and the second cut forming the recess or seat for the filling, with the same disadvantages, of course, as previously.

However, a still further disadvantage is present in rolls baked under previous methods, wherein the sheet of rolls is composed of a plurality of individual rolls baked as a unit but provided with a line of separation or breakage therebetween. When carrying out this foregoing method of baking, it was substantially impossible to produce uniformity of width in the rolls, as will be readily understood.

In carrying out my present invention, and as described in greater detail in my copending application, Ser. No. 570,068 filed Oct. 21, 1931, a sheet of roll material is baked and provided with grooves, lines, or other means to indicate the line of separation or the line of cut between the individual rolls. A sheet or loaf thus baked, therefore, comprises a single unit, rather than a plurality of individual units, and is possessed of greater strength than the previous sheet of rolls. This advantage becomes evident when cutting the rolls, as there is no tendency to separate the balance of the sheet during the process of severing an individual roll therefrom. This advantage is further evidence by the fact that a sheet of roll material, thus baked retains its freshness longer than a sheet of individual units wherein partial separation invariably occurs on any handling of the sheet.

In carrying out my present novel method of preparing sausage rolls, I sever an individual roll from the sheet of roll material, and simultaneous with said severing a slit or recess is formed longitudinally of the roll, from the upper surface downwardly, of a predetermined depth, sufficient to receive a sausage or other filling.

I have devised a novel knife to carry out the aforesaid method, said knife comprising a pair of blades, the cutting edges of said blades being parallel throughout the major portion of their length, but being on different planes. The blade which forms the sausage receiving recess is the shallower of the two blades, and is also shorter than the severing blade. Thus, regardless of the manner in which the knife is held during the severing and recess forming operation, said recess will be cut to a predetermined depth and no more.

The advantages of my novel method and knife will be instantly apparent to and understood by those skilled in this art, and since I believe that both said method and said knife are novel, I have claimed the same broadly in this application.

Referring to the drawings, illustrating a preferred embodiment of the present invention, Fig. 1 is a perspective view illustrating the use of my novel knife in carrying out my novel method;

Fig. 2 is a side elevation of said knife;

Fig. 3 is a top plan view of the knife; and

Fig. 4 is a fragmentary side elevation, on an enlarged scale, of a modified type of blade.

Referring now to the drawings, for a particular description of the invention, 1 designates a sheet of roll material provided with equi-spaced grooves 2 to indicate the lines of cut for severance of the individual rolls 3.

My novel knife is designated generally at 4, comprising the handle 5 and the blades 6 and 7. The blade 6 is referred to herein as the severing blade, or the inside blade. When severing a roll 3 from the sheet 1 it is the function of the blade 6 to completely sever said roll, while the blade 7 simultaneously forms or cuts a recess 8 in the roll being severed. From a glance at the drawings, it will be apparent that the cutting edge 9 of the blade 7 is of less depth than the cutting edge 10 of the blade 6. The distance between the planes 9 and 10 determines the depth of cut of the recess 8.

This difference in planes is maintained throughout the length of the blades 6 and 7, to the points 11 and 12. The distance between the planes of the points 11 and 12 may be greater than the distance between the planes 9 and 10, but not less than said distance between said planes 0 and 10. Thus, when an operator is serving a roll 3, should the knife be inclined at the conclusion of the cutting stroke, the depth of the groove 8 will not be increased, said recess maintaining its uniformity of depth throughout.

Thus, all the rolls of a sheet, with the exception of the end rolls, will have a smooth flat surface on each side thereof particularly adapted for toasting, which toasting operation will be facilitated by the smoothness of the side surfaces of the roll, and will result in a much neater and more attractive toasted roll. After toasting, the roll is opened along the recess 8, and the sausage or other filling inserted therein, whereupon the roll is ready for serving.

In place of the smooth edged blades 6 and 7, I may utilize the blades 13 and 14, having the serrated or saw-toothed edges 15 and 16 respectively. Otherwise the knives are the same, that is, with the inner or severing knife 13 of greater length and depth than the outer or recess forming knife 14.

It will be appreciated and understood that the union between the blades 6 and 7 and the handle 5 is for illustrative purposes only, as any type of handle may be utilized within the scope and range of my invention, it being only necessary that the inner or severing blade be of greater length and depth than the outer or recess forming blade.

When preparing the last roll of a sheet, for example the roll 17 in Fig. 1, the outer blade 6 will be placed against the outer edge of said roll, thus constituting a guide for the blade 7, to insure proper positioning of the recess 8 as well as predetermined depth of said recess.

While I have necessarily described my present invention somewhat in detail, it will be appreciated that I may vary the size, shape and arrangement of parts within reasonably wide limits without departing from the spirit of the invention.

My invention is further described and defined in the form of claims as follows:

1. The method of preparing sandwich rolls which consists in severing a roll from a sheet of baked roll material, and simultaneously forming a sandwich filler receiving recess in said roll by a slicing operation without removing any of the roll material.

2. The method of preparing sandwich rolls which consists in severing a roll from a sheet of baked roll material, and simultaneously forming a sandwich filler receiving recess of predetermined depth in said roll by a slicing operation without removing any of the roll material.

3. A knife of the kind described, comprising an inner blade adapted to sever a roll from a sheet of roll material, and an outer blade having its cutting edge disposed above the cutting edge of the inner blade to simultaneously form in the roll a sandwich filler receiving recess of less depth than the roll.

4. A knife of the kind described, comprising an inner blade adapted to sever a roll from a sheet of roll material, and an outer blade having its cutting edge disposed above the cutting edge of the inner blade to simultaneously form in the roll a sandwich filler receiving recess of less depth than the roll, said outer blade being of less length than said inner knife.

5. A knife of the kind described comprising an inner blade to sever a roll from a sheet of roll material, and an outer blade laterally spaced from the inner blade and having its cutting edge disposed above the cutting edge of the inner blade to simultaneously form in the roll a sandwich filler receiving recess of less depth than the roll, the free end of the outer knife being disposed inwardly with respect to the free end of the inner knife by an amount at least equal to the spacing of the cutting edge of the outer knife above the cutting edge of the inner knife.

In testimony whereof, I have signed my name to this specification.

JOHN U. LEMMON, Jr.